2,912,904
MILLING MACHINE ARBOR

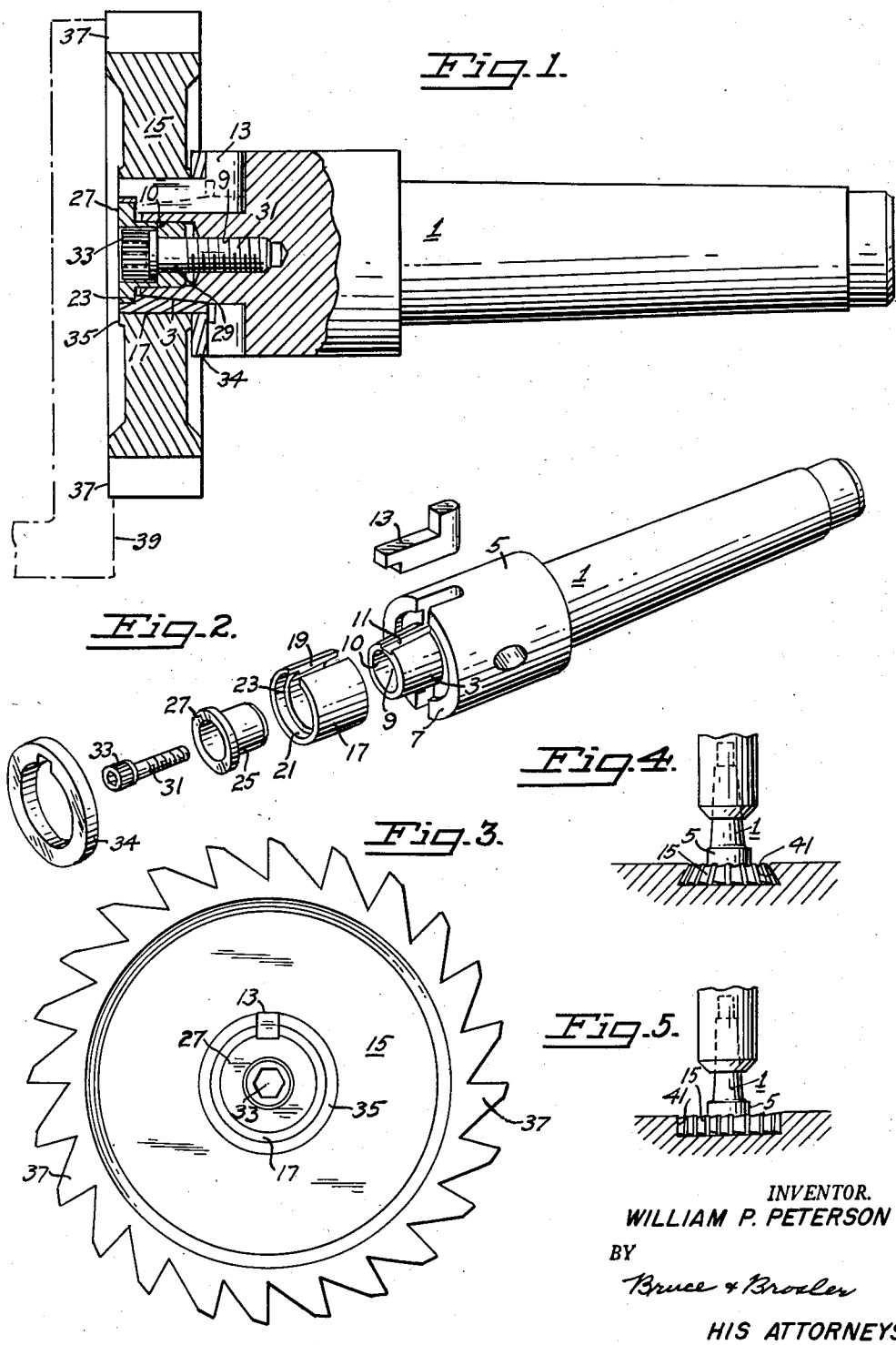

William P. Peterson, Oakland, Calif.

Application October 31, 1955, Serial No. 543,851

1 Claim. (Cl. 90—11)

My invention relates to milling machines and more particularly to an arbor for mounting a milling cutter on such machine.

Many machine jobs such as surfacing and cutting of wide grooves or slots in the surface of metal practically require the use of a shaper, which necessarily is a slow operation, involving careful control of the cutting tool to realize close tolerances and accuracy.

Among the objects of my invention are:

(1) To provide a novel and improved means for performing shaper operations, but in a more direct and expeditious manner;

(2) To provide a novel and improved milling machine arbor capable of expanding the field of operation of milling machines;

(3) To provide a novel and improved milling machine arbor capable of use with side milling cutters in performing, and with greater speed and accuracy, many of the jobs previously requiring a shaper;

(4) To provide a novel and improved milling machine arbor capable of fulfilling the foregoing objects without chatter.

Additional objects of my invention will be brought out in the following description of a preferred embodiment of the same taken in conjunction with the accompanying drawings, wherein Figure 1 is a view, partly in section, of my improved arbor in use on a surfacing operation;

Figure 2 is an exploded view of the arbor of Figure 1;

Figure 3 is an end view of the arbor of Figure 2 with a side cutter assembled thereon;

Figures 4 and 5 are schematic views depicting additional operations of which the arbor of the present invention is capable.

Referring to the drawings for details of my invention in its preferred form, the arbor includes a shank 1 terminating in a tapered end section 3 which is preceded by a section 5 of greater diameter to provide a shoulder 7. The tapered end section is preferably formed with an exposed axial threaded recess 9 enlarged at its outer end by a counter bore 10. In addition, the tapered end section is provided with a key slot 11 in the outer surface thereof, which slot extends into the adjacent larger diameter section. This slot is adapted to receive a suitable key 13 for interlocking the arbor with a suitable cutter 15 to be mounted thereon, whereby to effect a positive drive relationship between the arbor and the cutter.

For application to the tapered end of the arbor, I provide a bushing 17 having a substantially cylindrical outer surface, and a sloping inner surface forming a substantially complementary fit on the tapered end section of the arbor, when the bushing is assembled part way thereon.

This bushing is made expandable preferably by a single split 19 longitudinally thereof to convert the bushing to a half split bushing, the split being of sufficient width to permit the bushing to straddle the key 13 when the key is disposed in the slot provided for it.

In the exposed end of the bushing, is a counterbore 21 of a depth less than the distance to the end of the tapered end section, when the bushing is in its part-way assembled position. Such counter-bore results in the formation of an internal shoulder 23 against which pressure may be brought to bear in order to advance the bushing upon the tapered end section of the arbor to effect an expansion thereof.

The normal outside diameter of the bushing is such as to slidably receive a milling cutter having an axial opening of a standard diameter, whereby upon subsequent expansion of the bushing, a tight grip will be effected between the bushing and the cutter to effectively hold the cutter on the arbor and preclude chatter during a cutting operation. It is important to note, however, that such grip is not relied on for driving the cutter, in that the key takes on this function and in a most positive manner.

To effect the desired expansion of the split bushing, a sleeve 25 adapted to slide into the counterbore 10 is provided with a flange 27 of a diameter and thickness to fit flush within the counterbore 21 of the bushing and rest against the shoulder 23 thereof, the length of the sleeve being sufficiently short to permit such contact with the shoulder.

The sleeve incorporates a passage 29 of a diameter to slidably receive a bolt 31 adapted to thread into the tapered end section. This sleeve, like the tapered end section and bushing, is also counterbored, but to a depth sufficient to receive the head 33 of the bolt in a flush fit. By providing the head of the bolt with an Allen wrench recess, manipulation of the bolt may be rapidly and conveniently accomplished.

To accommodate cutters of different thicknesses, one or more washers 34 may be utilized.

The milling machine arbor assembly thus far described, while it may be utilized to advantage in accommodating any one of many different types of milling machine cutters, is significant from the viewpoint of what can be accomplished when used with side milling cutters.

A cutter of this type, in addition to a hub 35, is provided with side cutting teeth 37, the side cutting edges of which lie in a plane beyond the plane of the hub. The means provided by the present invention for mounting the cutter on the arbor, permits of terminating the mounting means, including the head of the bolt, in substantially the plane of the hub, whereby such mounting means will not interfere with the simultaneous cutting operation of all of the teeth against a planer surface, thereby enabling the cutter to cut a path the full diameter of the cutter. By reason of this, the field of usefulness of a side milling cutter has been expanded considerably to include many jobs which formerly called for the use of a shaper to accomplish. Furthermore, through the use of the improved arbor of the present invention with a side milling cutter, such jobs can now be done faster and to closer tolerances.

Thus it is now possible through reliance on the present invention, to take down a complete surface 39 as depicted in Figure 1, or cut wide grooves 41 therein the full diameter of the cutter and with or without undercuts as depicted in Figures 4 and 5. Such jobs have previously been impossible with prior art milling machine arbors.

The above described arbor represents the preferred form of my invention. While I have described the same in considerable detail, it is apparent that such embodiment is subject to alteration and modification without departing from the underlying principles involved. Therefore, I do not desire to limit myself in my protection to the specific details illustrated and described except as may be necessitated by the appended claim.

I claim:

In combination, an arbor including a shank having an enlarged section provided with a shoulder and terminating in a relatively reduced tapered end section, the latter being formed with an exposed axial threaded recess enlarged at its outer end by a counterbore, said tapered end section being provided with a key slot in the outer surface thereof, which key slot extends into said enlarged section, a key in said key slot for interlocking the arbor with a cutter to be mounted thereon, whereby to effect a positive drive relationship between the arbor and the cutter, a bushing on said tapered end section of the arbor having a substantially cylindrical outer surface and having a tapered inner surface forming a substantially complementary fit on said tapered end section of the arbor, said bushing being made expandable by a single split longitudinally thereof, said split being of sufficient width to permit the bushing to straddle said key disposed in said key slot, the exposed end of said bushing being provided with a counterbore of a depth less than the distance to the end of said tapered end section, such counterbore resulting in the formation of an internal shoulder against which pressure may be brought to bear in order to advance said bushing upon said tapered end section of the arbor to effect an expansion thereof, the normal outside diameter of said bushing being such as to slidably receive a milling cutter having an axial cylindrical opening, whereby upon subsequent expansion of said bushing, a tight grip will be effected between said bushing and said cutter to effectively hold the cutter on the arbor and preclude chatter during a cutting operation, a sleeve slidable in the bushing, said sleeve being provided with a flange of a diameter and thickness to fit flush within the counterbore of said bushing and rest against the shoulder thereof, the length of the sleeve being sufficiently short to permit such contact with said shoulder, said sleeve incorporating a bore, a bolt passing through said bore and threaded into said tapered end section, said sleeve being counterbored to a depth sufficient to receive the head of the bolt in a flush fit and forming a shoulder to abut the head of the bolt, the structure being such as to lie within the plane of a cutter mounted on said bushing.

References Cited in the file of this patent

UNITED STATES PATENTS

| 1,472,565 | Mannnig | Oct. 30, 1923 |
| 1,561,507 | Clark | Nov. 17, 1925 |
| 1,797,296 | Ray | Mar. 24, 1931 |
| 2,475,042 | McCloskey | July 5, 1949 |

FOREIGN PATENTS

| 247,281 | Switzerland | Dec. 1, 1947 |
| 1,039,212 | France | May 13, 1953 |